(12) United States Patent
Singh (10) Patent No.: US 6,868,526 B2
(45) Date of Patent: Mar. 15, 2005

(54) GRAPHICAL SUBCLASSING

(75) Inventor: Sanjai Singh, Bangalore (IN)

(73) Assignee: The Mathworks, Inc., Natick, MA (US)

( * ) Notice: Subject to any disclaimer, the term of this patent is extended or adjusted under 35 U.S.C. 154(b) by 549 days.

(21) Appl. No.: 09/908,085

(22) Filed: Jul. 18, 2001

(65) Prior Publication Data

US 2003/0016246 A1 Jan. 23, 2003

(51) Int. Cl.[7] .................................................. G09G 9/00
(52) U.S. Cl. ....................... 715/763; 715/619; 715/621; 715/762; 715/764; 715/765; 715/767; 715/771
(58) Field of Search ................................. 345/619, 621, 345/661, 764, 765, 767, 771, 775; 715/619, 621, 661, 762, 763–765, 767, 771, 775

(56) References Cited

U.S. PATENT DOCUMENTS

| | | | | |
|---|---|---|---|---|
| 5,481,741 A | * | 1/1996 | McKaskle et al. | 345/522 |
| 5,627,979 A | * | 5/1997 | Chang et al. | 345/763 |
| 5,808,611 A | * | 9/1998 | Johnson et al. | 345/804 |
| 5,913,063 A | * | 6/1999 | McGurrin et al. | 717/109 |
| 5,920,718 A | * | 7/1999 | Uczekaj et al. | 717/109 |
| 6,061,515 A | * | 5/2000 | Chang et al. | 717/114 |
| 6,078,320 A | * | 6/2000 | Dove et al. | 345/866 |
| 6,307,546 B1 | * | 10/2001 | Wickham et al. | 345/771 |

* cited by examiner

Primary Examiner—Raymond J. Bayerl
Assistant Examiner—Cuong T. Thai
(74) Attorney, Agent, or Firm—Lahive & Cockfield, LLP (57) ABSTRACT

A subclassing mechanism for use in developing graphical block diagram models is described. A graphical class instance of a library graphical class that corresponds to a graphical subsystem block of one or more interconnected graphical blocks is constructed for use in a graphical block diagram model of a user. An interface for enabling changes to parameter values of at least one of the graphical blocks to be made by and accepted from the user is provided. The changes are applied to the graphical class instance to produce a graphical class instance that inherits structure from the library graphical class.

20 Claims, 10 Drawing Sheets

GRAPHICAL SUBCLASSING

BACKGROUND

The invention relates generally to graphical block diagram modeling.

Dynamic systems may be modeled, simulated and analyzed on a computer system using graphical block diagram modeling. Graphical block diagram modeling graphically depicts mathematical relationships among a system's inputs, states and outputs, typically for display on a graphical user interface.

In the context of graphical block diagram modeling, blocks are graphical structures that have a defined functionality. Such blocks can be interconnected by lines to form subsystem blocks that implement a function or an algorithm. An example of a block is a gain component acting as a multiplier to an input signal and an example of a subsystem block is the gain block being used to amplify an input signal generated by an input signal block. Subsystem blocks may in turn be connected to and contain other subsystem blocks, thus allowing for a hierarchical design structure and representation of more complex functional units. Continuing with the same example as above, the amplified signal may be used to drive a more complex system such as a modulator. Such subsystem blocks may be placed in a reference library to define a graphical class. Graphical libraries are similar to system software libraries in that they are a repository of classes. These classes, or more specifically, graphical classes, can be used by multiple users to build custom systems. When a graphical class is used in a model, it is said to be instantiated, i.e., an instance of the graphical class is created for use in the model. Such an instance can also be referred to as a link to the graphical class that resides in the library. Parameters are class members that are specified when a user constructs a new instance of a class. In the subsystem block example above, the signal type and the gain factor could potentially be parameters for the graphical class. Instances associated with the class have parameter specification interfaces that allow a user to define these "top-level" parameters. On a graphical user interface (or "GUI"), such parameter specification interfaces take the form of a dialog box with various parameter fields. A user can therefore change the top-level parameters of an instance by changing parameter data in a parameter field in the dialog box for that instance.

Prior block diagram modeling and simulation software packages, e.g., Simulink® version 3.0 and SystemBuild™, allow only values of top-level parameters of an instance to be changed. Typically, to modify an individual block within a graphical subsystem block in a library (and therefore modify behavior of the subsystem block), a user has to make a local copy and apply any changes to that local copy. This approach is problematic, however, in that the local copy does not inherit any changes or improvements made to the original class. As a result, the local copy (in essence, a new class) quickly diverges from the original class and inclusion of the changes to the original class in the new class requires that the new class be updated manually. Another approach would be to specify all parameters of all of a subsystem block's components at the top level. This can, however, get extremely complicated for non-trivial classes and prove to be unusable.

SUMMARY

In one aspect, the invention provides methods and apparatus, including computer program products, for graphical block diagram modeling. The methods include: providing graphical blocks interconnected to form a graphical subsystem block; constructing a graphical class instance of a graphical class that corresponds to the graphical subsystem block for use in a graphical block diagram model of a user; enabling a change to a value of a parameter of one of the graphical blocks to be made by the user; and constructing from the graphical class instance and the change a graphical subclass instance that inherits structure from the graphical class.

Particular implementations of the invention may provide one or more of the following advantages. Subclassing graphical structures allows a user to customize and tune parameters of a graphical class instance while still inheriting the structural implementation of the original (library) graphical class. Because graphical subclassing can be used to override or modify the built-in behaviors of a parent graphical class, it greatly extends the usefulness of graphical libraries by providing a degree of flexibility missing in prior block diagram modeling solutions. More particularly, graphical subclassing provides an easy-to-use extension for graphical libraries that allows a user to benefit from improvements made in the library as well as tailor a graphical class instance to suit specific requirements.

Also, unlike prior techniques that construct a new graphical class and therefore maintain a copy of the original graphical class, subclassing only requires that the differences between the graphical subclass and the original graphical class be stored. Thus, with graphical subclassing, storage of class definition data is optimized.

Other features and advantages of the invention will be apparent from the following detailed description and from the claims.

DETAILED DESCRIPTION

Figure 1:
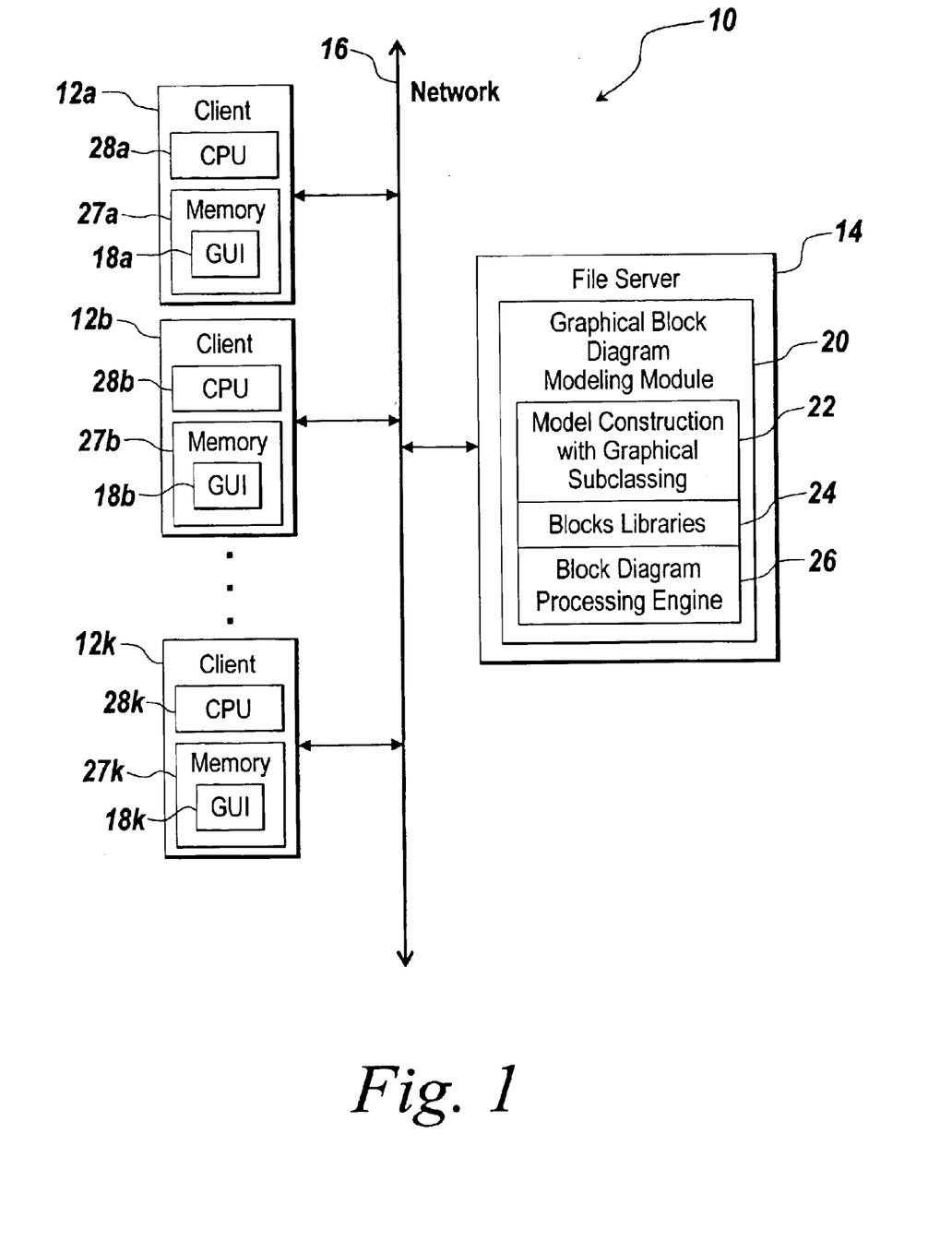
FIG. 1 is a block diagram of a system that includes a file server that stores a graphical block diagram modeling module with graphical subclassing capability and client systems that access from the file server and execute processes of the graphical block diagram modeling module for graphical block diagram model development.

Referring to FIG. 1, a system 10 includes client systems 12a, 12b, . . . , 12k and a file server 14 each connected to a network 16, e.g., an Ethernet network, the Internet, or other type of network. Alternatively, instead of being connected to a network, the systems 12 and 14 could be interconnected by a system bus such as Fibre Channel. Each of the client systems 12a, 12b, . . . , 12k includes a graphical user interface (GUI) 18a, 18b, . . . , 18k. The file server 14 is configured with a graphical block diagram modeling module 20 (hereinafter, simply, "the module"), which is implemented in software. The module 20 includes a model constructor/editor with graphical subclassing capability 22, as will be described later. The module further includes a blocks library 24 and a block diagram processing engine 26. As will be explained more fully below, the model editor 22, in conjunction with the library 24, is used by a client system user to construct and display a graphical block diagram model which visually and pictorially represents a dynamic system of interest to that user. The block diagram processing engine 26 processes the block diagram generated by the model constructor 22 to produce simulation results. Although not shown, the module 20 could also include a code generator for converting block diagrams to executable code.

The system 10 illustrates a remote client access configuration in which the module 20 is installed on a central file server, i.e., the file server 14, and users of the client systems 12 access the module 20 over the network 12. In an alternative configuration, e.g., in an environment in which access to the library 24 is not shared by multiple users, the module 20 could be installed on a single stand-alone or networked computer system for local user access.

Each of the client systems 12a, 12b, . . . , 12k, includes a respective memory 27a, 27,b, . . . , 27k, for storing all or accessed portions of the module 20, as well as a respective CPU 28a, 28b, . . . , 28k for executing the stored portions of the module 20, the GUI 18 and other OS programs (not shown) for controlling system hardware. Although not shown, it will be understood that the systems 12 and 14 can be, in other respects, of a conventional design and architecture. That is, the systems 12 include conventional system I/O peripherals, e.g., display, mouse, keyboard and the like, for enabling user interaction with the system. The file server 14 includes conventional server software and hardware, and thus includes the appropriate storage for storing the software programs of the module 20, along with OS and server application programs, and CPU for executing those programs.

For illustrative purposes, the module 20 will be described within the context of a Simulink® and MATLAB® based simulation environment. Simulink® and MATLAB® are commercial software products available from The MathWorks, Inc. The Simulink® software package includes a number of different tools, such as special user interfaces and navigational tools, e.g., a library browser, which will be referenced in the description to follow. Further details of these tools and interfaces can be had with reference to available Simulink® and MATLAB® product documentation. It will be understood, however, that other block diagram based modeling software platforms could be used.

The term "graphical block diagram" refers to a set of graphical blocks (or nodes) and a set of lines (or signals) that carry data between the graphical blocks. Each graphical block typically performs a function and that function (or equation) is a sub-component of an overall set of equations describing a dynamic system. The function may be mathematical in nature or it may be an operation such as reading data from a hardware device. The graphical blocks may be parameterized with user-defined or default values, as will be described.

Thus, a graphical block diagram is a form of graphical programming for functional and object-oriented development methodologies. Each graphical block implements a set of equations that define how the block operates. Using the equations defined by the blocks, the graphical block diagrams can be executed in an interpreted environment to produce simulation results as defined by the graphical blocks and signals in a model.

The module 20 enables users to copy graphical subsystem blocks into their models from the libraries 24 (or, optionally, from external libraries). Because there is a link between a source library subsystem block and its instantiation (instance or reference copy), the module 20 updates the reference copy when the source library subsystem block changes, thus ensuring that a model incorporates the most recent version of the graphical subsystem blocks when needed.

Figure 2A:
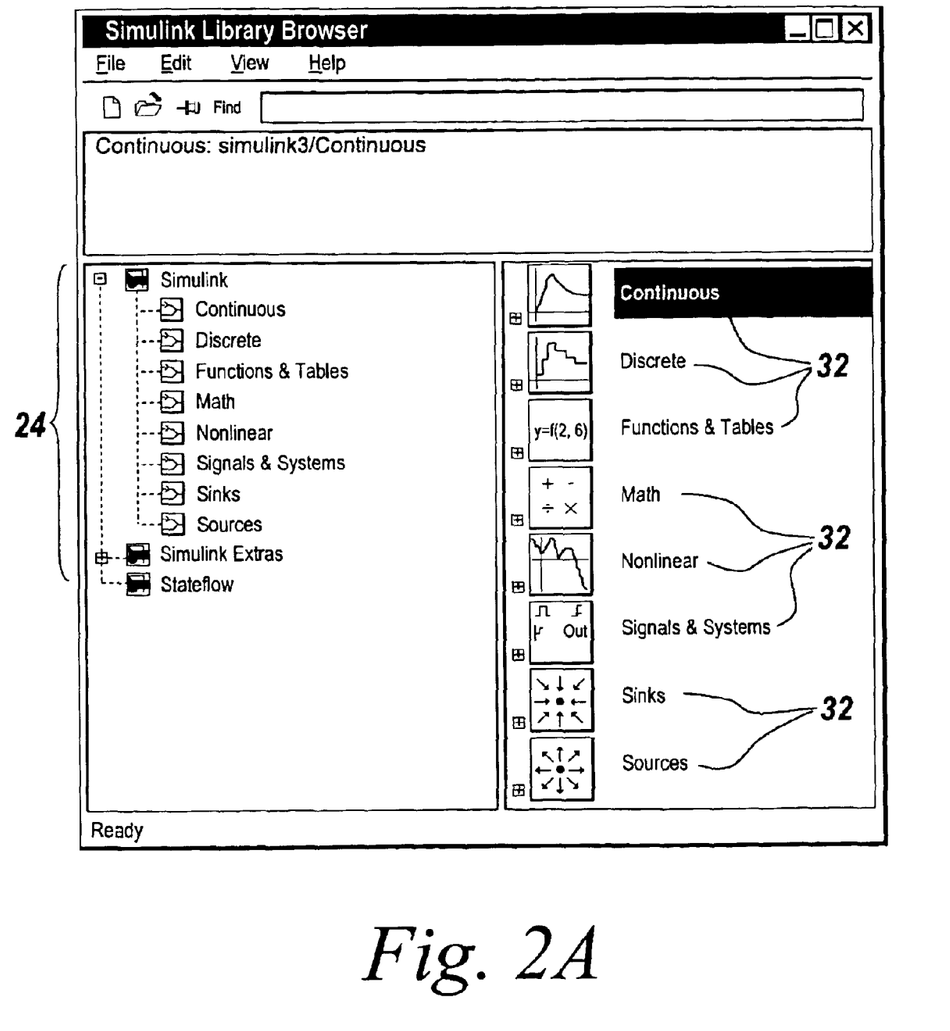
FIGS. 2A and 2B are screen display depictions of an exemplary library of graphical blocks provided by the graphical block diagram modeling module (of FIG. 1) and available for use in developing a graphical block diagram model.
Figure 2B:
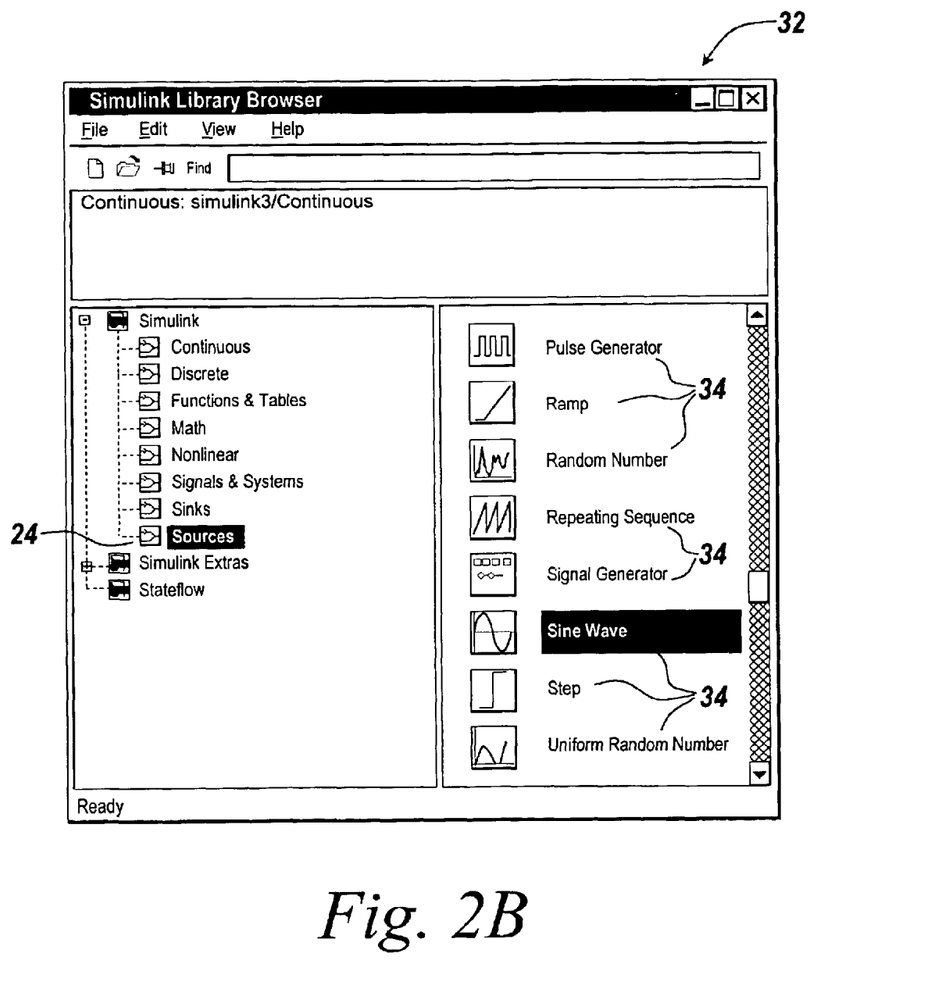

FIGS. 2A–2B provide screen shot depictions of an exemplary embodiment of the library 24 as a Simulink® library as presented in a window of the library browser 30. As shown in FIG. 2A, the library 24 is a collection of libraries 32 each corresponding to different groupings or categories of blocks. It will be appreciated that the libraries are represented within the context of the library browser as nodes or icons. As shown in FIG. 2B, each library 32 includes a set of one or more blocks 34. The blocks 34 in the library 24 can include both the most basic building blocks or elements, i.e., the graphical blocks, and the more complex graphical subsystem blocks made up of interconnected ones of the graphical blocks (or sub-blocks), as was described above. In the particular example shown in FIG. 2B, a user has selected a "sources" library, which includes among the members of its set of graphical blocks the graphical blocks "pulse generator", "ramp", "random number", "repeating sequence", "signal generator", "sine wave", "step" and "uniform random number". Each subsystem block, for example, the "repeating sequence" graphical subsystem block, has a detailed implementation (not shown) of the function to which it corresponds. Thus, a user operating one of the client systems 12 uses the blocks 34 in the libraries 32 to build a graphical block diagram using the model editor 22.

Because changes cannot be made on the graphical class without altering its behavior (and therefore altering that graphical class' behavior for all users of the graphical class), the model editor 22 is used to make changes to an instance of the graphical class. The manner in which the model editor 22 modifies an instance for parameters other than the top-level parameters results in the creation of an instance of a subclass of the original graphical class (that is, the super class), as will be described in further detail below. As used herein, that is, in a graphical context, the term "subclassing" relates to the modification of operating parameters of individual graphical blocks (or sub-blocks) in a graphical subsystem block corresponding to a graphical class (or super class).

Operating parameters of graphical blocks control either the signal transformations that the block performs or the block's graphical structure. [An example of an operating parameter that controls the block's graphical structure is the number of inputs to a Sum or a Product block.] In a preferred embodiment, the graphical subclass and its super class should be the same structurally so that they have identical layouts and connectivity of their components. Therefore, the model editor 22 performs subclassing in such a way as to prevent the modification of operating parameters that alter graphical structure. Stated in a different way, graphical structure and connectivity of components in the instance are maintained during subclassing of the model editor 22.

Figure 3:
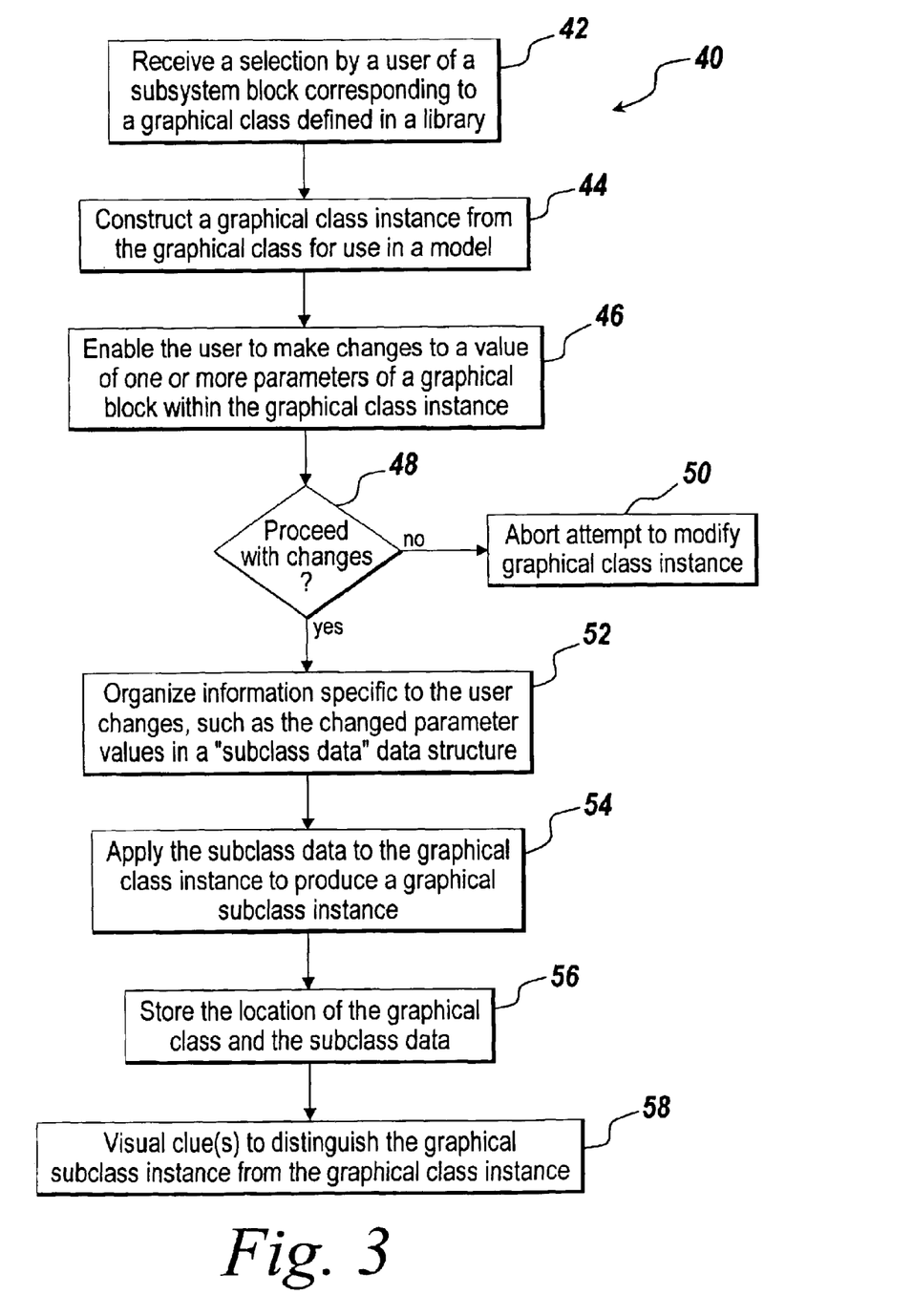
FIG. 3 is a flow diagram of a graphical subclassing process of the graphical block diagram modeling module of FIG. 1.

Referring to FIG. 3, a subclassing process 40 of the model editor 22 is shown. The process 40 receives a selection by a user of a subsystem block corresponding to a graphical class defined in the library (step 42). The process 40 constructs a graphical class instance from the graphical class for use in a model (step 44). The process enables the user to make changes to a value of one or more parameters of a block within the graphical class instance (step 46). The process determines if the user wants to proceed with the changes (step 48). If the process 40 receives indication from the user that the user does not wish to proceed any further, the process 40 aborts the attempt to modify the graphical class instance (step 50). If the process 40 determines that the user wishes to continue with the subclassing operation, the process 40 organizes information specific to the user changes, such as the changed values, as a data structure ("subclass data") (step 52). The process 40 applies the subclass data to the graphical class instance to produce a graphical subclass instance (step 54). Once the graphical subclass instance has been built, the process 40 stores the location of the graphical class (or super class) so that the source of the graphical class instance can be determined and stores the subclass data as well (step 56). Lastly, the process 40 provides one or more visual cues to the user so that the user may distinguish the graphical subclass instance from the graphical class instance (step 58). For example, and as described more fully below, the process 40 can add a visual cue to one or both of the modified block and the modified instance.

Figure 4:
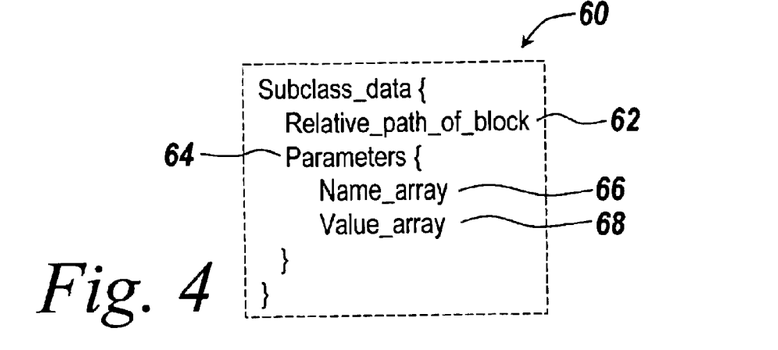
FIG. 4 is a data structure used to store subclass data captured during the graphical subclassing process.

Referring to FIG. 4, an exemplary definition of a data structure for storing the subclass data 60 is shown. The data structure definition 60 specifies a relative path of the block to the graphical class instance (or link) 62 and stores in arrays information associated with the modified parameters 64, including a parameter name 66 and a value 68.

In the graphical subclassing process 40, therefore, the graphical structure of a subsystem block is inherited from the library graphical class while each instance provides its own set of data for each individual block or component within the graphical structure. This set of data is the subclass data. As indicated earlier, the subclass data only includes differences between the super class and the subclass definitions, thus achieving optimal storage of the subclass definitions.

The manner in which the graphical subclassing mechanism is used in the generation of a model is illustrated in the GUI screen shots of FIGS. 5A through 5M. In the described embodiment, and as noted earlier, graphical classes define subsystems placed in libraries and can be used by multiple users in their respective models.

Figure 5A:
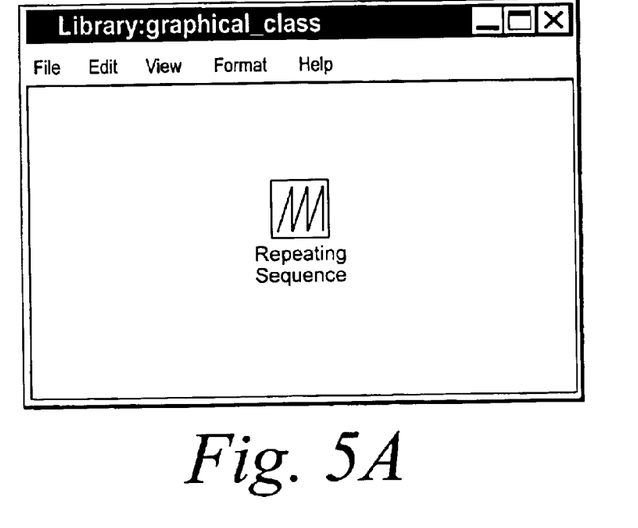
FIGS. 5A through 5M are exemplary screen displays from a GUI of a client system executing the graphical subclassing process (of FIG. 3) during graphical block diagram model development.

Referring to FIG. 5A, having already selected an existing graphical class from a menu provided by the library browser and opened a library window for the selected graphical class, the user views the selection in a library window. In the example shown, the selected block is a "repeating sequence" subsystem block residing in a library called "Graphical_class".

Figure 5B:
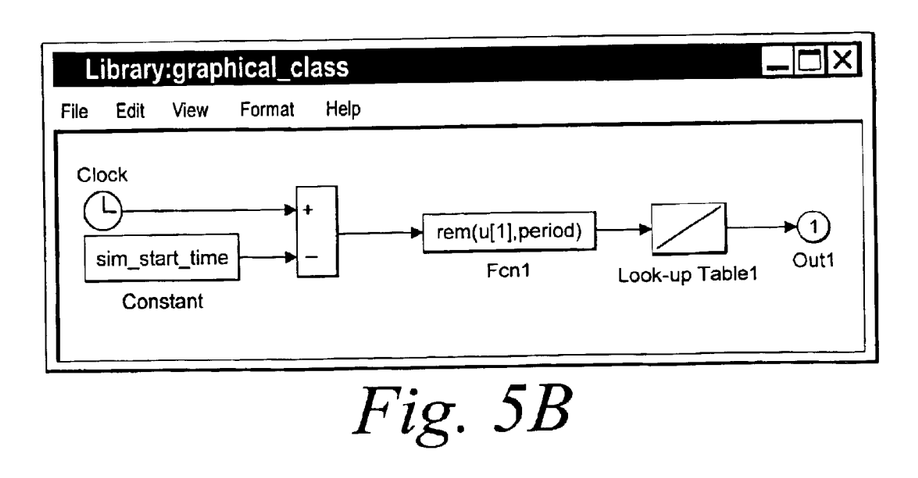

The user clicks on the repeating sequence icon to view the implementation details of the selected graphical class corresponding to the selected graphical subsystem block, in this example, the "repeating sequence" subsystem block, as shown in FIG. 5B. The "repeating sequence" subsystem block includes interconnected blocks, e.g., look-up table, sim_start_time constant, interconnected to perform a function, that is, to generate a repeatable arbitrary signal.

Figure 5C:
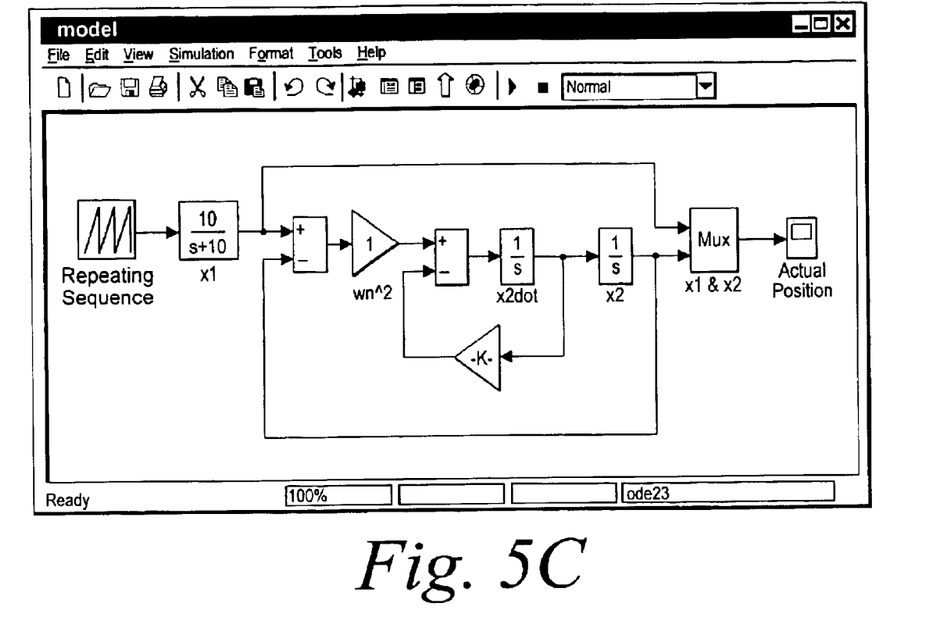

Having opened a model window for the model to be generated and edited, the user copies the selected block from the library window to the model window, by clicking on the library node in the library browser to display the blocks in that library, selecting the repeating sequence block and dragging the block from the library browser and dropping it in the model window. A screen display of the model window showing the placement of the selected block within the user's model is shown in FIG. 5C. An instance linked to the graphical class in the library is created for the block at the point where the user drops the node icon.

When a library graphical class is used, an instance of that graphical class inherits its structure, and therefore its functionality, from the implementation in the library. Each instance can define its "top-level" parameter values and each instance can use a different set of parameter values. This is akin to the concept of a class constructor that is used in object oriented programming languages such as Java and C++. Instances associated with the graphical class have parameter specification interfaces that allow a user to set values for these "top-level" parameters. On the user's GUI, such as the GUI 18 (of FIG. 1), such parameter specification interfaces take the form of a dialog box with various parameter fields. A user can therefore change the top-level parameters of an instance by changing parameter data in a parameter field in the dialog box for that instance.

Figure 5D:
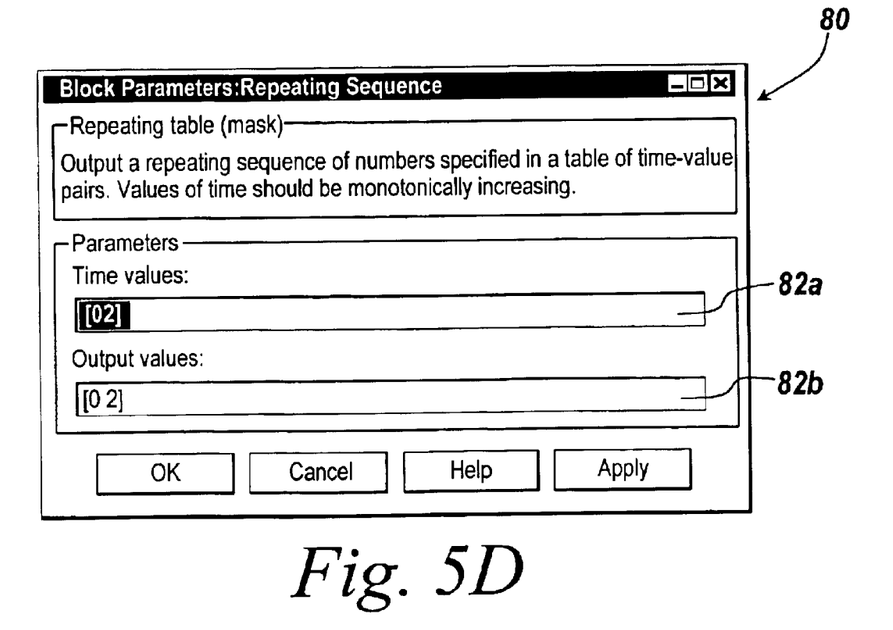

Referring to FIG. 5D, a top-level instance parameters dialog box 80 for the repeating sequence block is shown. The user uses parameter fields 82*a*, 82*b* to set or override a default setting for respective parameter values, or, in this example, time values and output values.

Figure 5E:
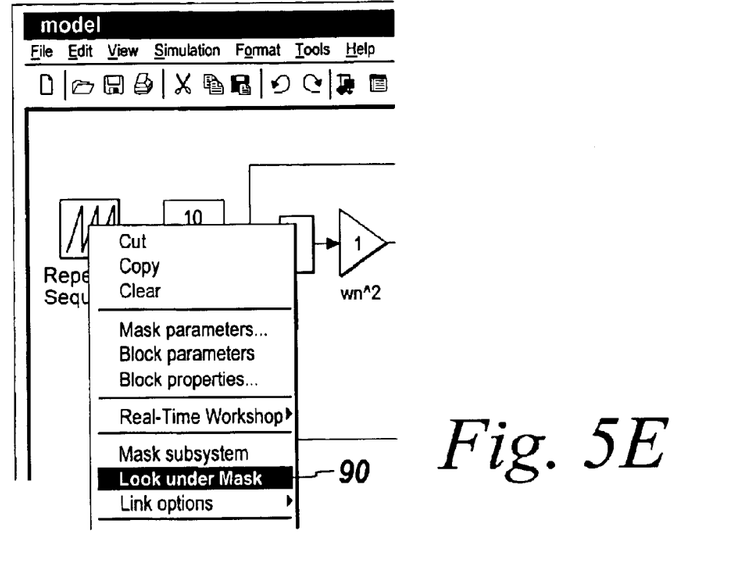

In accordance with the subclassing mechanism, a user wishing to further customize a model can identify a subsystem block and a block within the subsystem block for further modification. In the running example, the user has identified the repeating sequence subsystem block as the instance of the graphical class that is to be further modified. Referring to FIG. 5E, the user, still operating within the model window, opens the contents of that subsystem block by double-clicking the subsystem block or looking under the mask of the "masked" subsystem by invoking the relevant menu item, a "Look under mask" menu item 90, as shown.

Figure 5F:
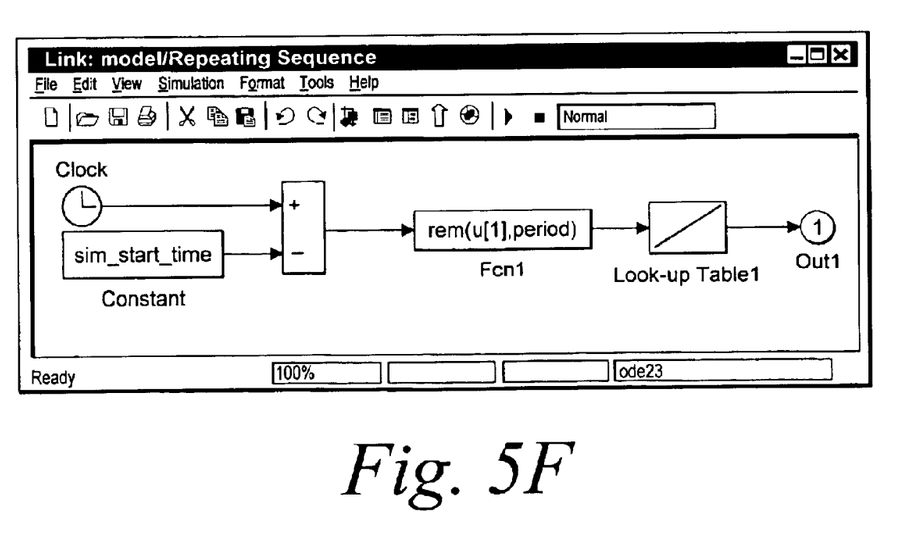

At this stage, the user opens the contents of the instance (link) that they wish to modify or override, and is provided with the implementation of the selected block (in this example, the repeating sequence subsystem block), as shown in FIG. 5F. The user selects one of the blocks within the implementation as a block to be modified.

Figure 5G:
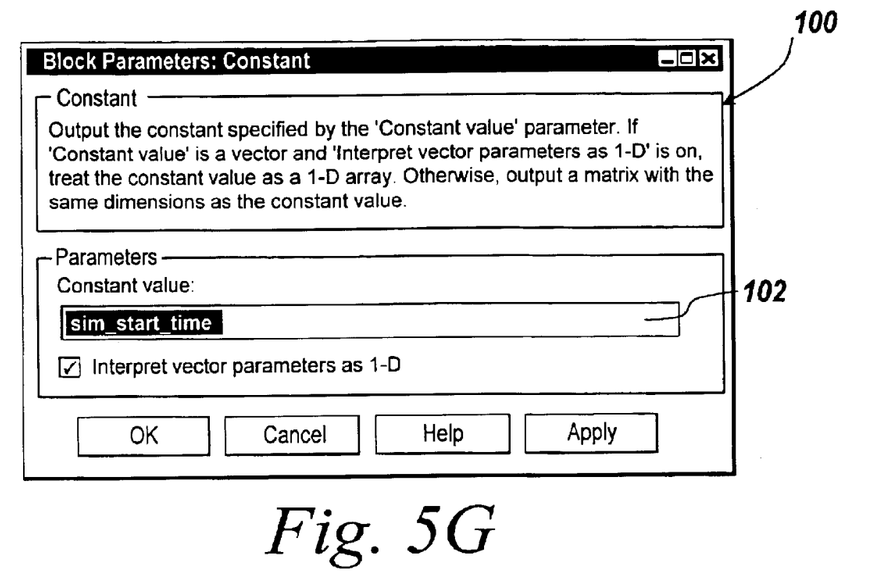
Figure 5H:
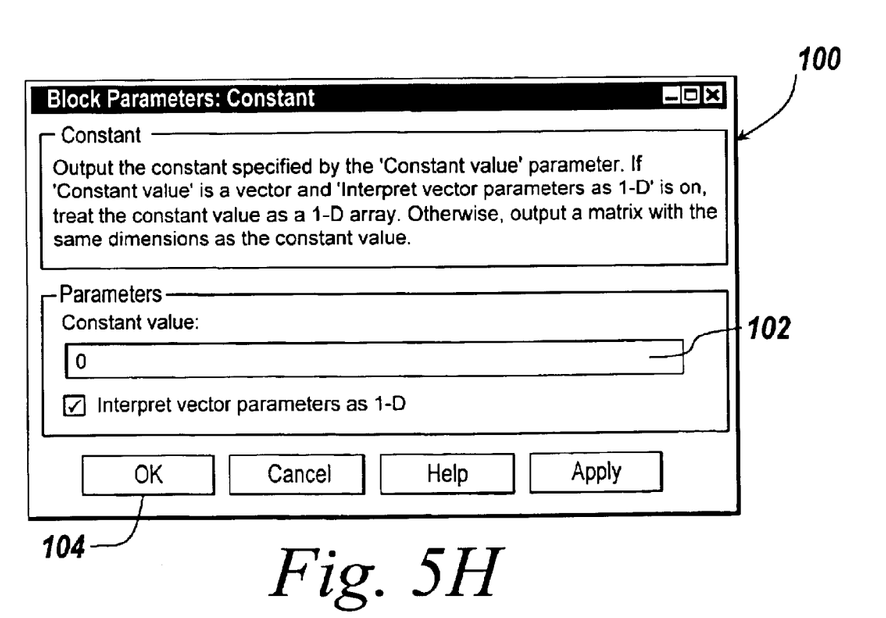

Referring to FIG. 5G, a lower- or implementation-level block parameters dialog box 100 provided to the user in response to the user's selection is shown. Continuing with the example of the repeating sequence block, the selected block is the "constant " block and the appropriate block parameters dialog box for the constant block is provided to the user. The dialog box 100 includes a parameters field 102 for specifying or overriding a value for an operating parameter of the block with which the dialog box 100 is associated. In the example shown, the field 102 includes one parameter, a constant, which is set to a default value, "sim_start_time". Referring now to FIG. 5H, the user changes the constant value in the field 102 to a value of zero and clicks the "OK" button 104 to complete the change.

Figure 5I:
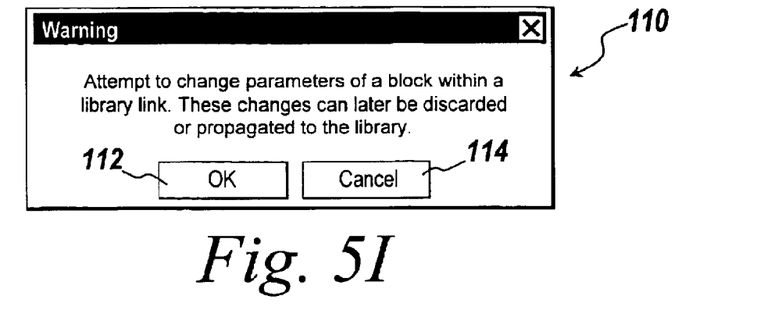

Referring to FIG. 5I, since this modification is the first modification to the instance, the user is provided with a warning in the form of a warning dialog box 110 to prevent accidental changes. If the user clicks on a warning dialog box OK button 112 of the warning dialog 110, the changes are applied to the instance to construct a subclass instance, as was described above with reference to FIG. 3, step 54. If the user clicks on a warning dialog box cancel button 114, the user's modification attempt is aborted.

In the foregoing manner, therefore, a user can change any number of parameters of any one or more components within the link subsystem hierarchy. As was earlier mentioned, the graphical subclassing process 40 (of FIG. 3) enables editing of only those parameters that don't cause a structural change in the link. An example of a structural change would be a change to the number of input or output ports of a component.

Figure 5J:
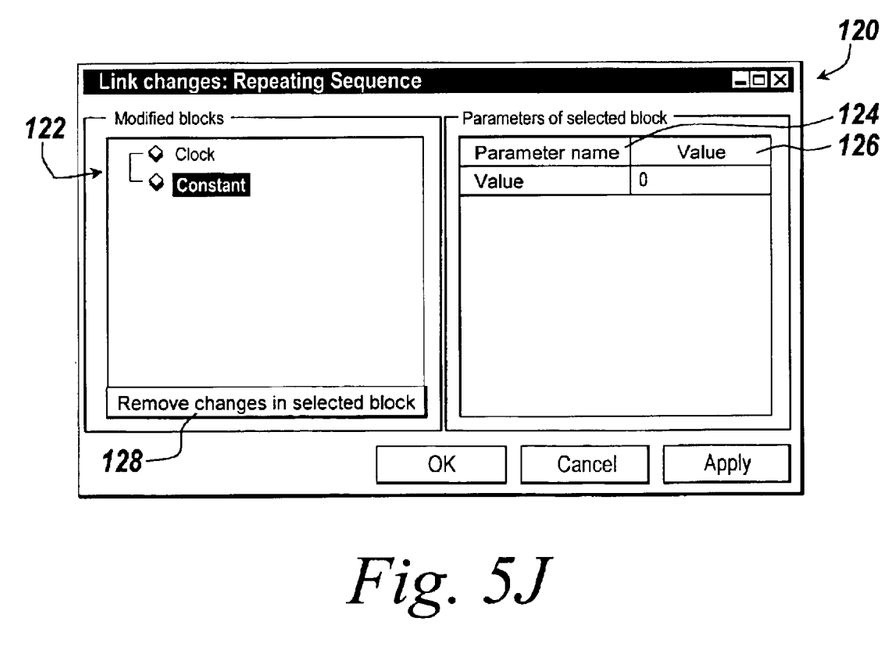

Since users can change the parameters of many components in a graphical class, it is useful to have a user interface that displays all of the changes made in the subclass as compared to the super class. Referring to FIG. 5J, information pertaining to the changes by the user is displayed to the user in a "link changes" window 120. The window 120 shows a list of the modified blocks 122. A selection of a block on the list provides for that block names of any changed parameters 124 and values associated with the changed parameters 126. This user interface provides a mechanism in the form of a "Remove changes in selected block" button 128 to allow the user to edit the subclass data.

Figure 5K:
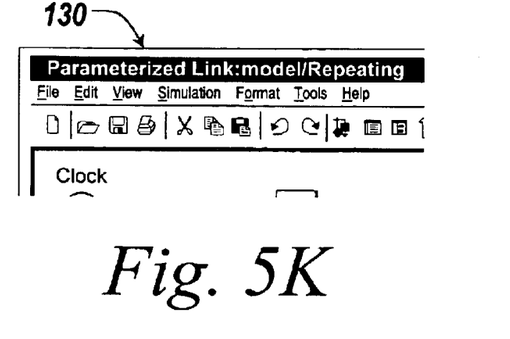
Figure 5L:
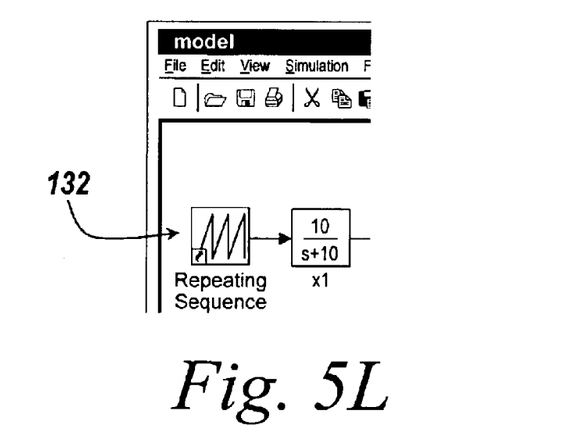

To identify graphical subclass instances, it is important to add identification that distinguishes the graphical subclass instances from regular graphical instances. Since the graphical layouts and structures of a class and subclass are identical, it is difficult to visually differentiate between their instances unless the user is provided with some visual cues. To that end, and as was described above in reference to FIG. 3 (step 58), visual cues are provided to the user to identify any graphical subclass instances. In the described embodiment, as shown in FIG. 5K, the window title is changed a "parameterized link" title 130 to reflect that the link is a parameterized link. Optionally, and as depicted in FIG. 5L, the modified subsystem block (as displayed in the model window) can be changed to a subsystem block having a visual cue 132, shown in the figure as a red arrow on the lower left corner of the icon of the graphical subclass instance, to indicate its new state.

Figure 5M:
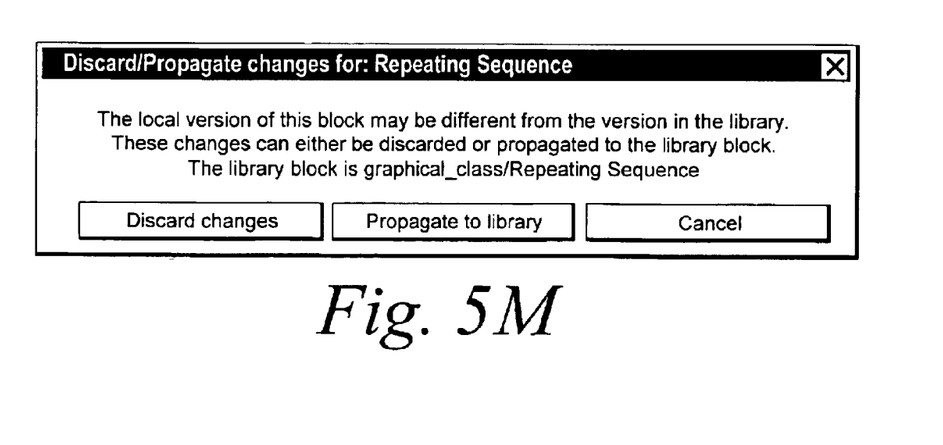

The subclassing mechanism also provides for navigation and merge capabilities. It allows a subclass to have easy graphical access to its super class and provides the ability to merge these classes. In some cases, users would like to either push their changes to the original implementation, i.e., make the super class be the same as the subclass. In other cases, users might realize that their subclass is error prone and that they would rather have the super class re-instantiated. Both of these options are made available to the user via a menu item. Referring to FIG. 5M, the selection of the appropriate menu item invokes a "discard/propagate changes" dialog box 140. This dialog provides the user with discard and propagate options in the form of a "discard changes" option button 142 and a "propagate to library" option button 144.

Preferably, the system 10 includes a configuration control mechanism to control user access to the blocks that reside in the libraries 32. Such control can prevent a user from viewing or modifying the contents of a library subsystem block while still allowing the user to employ the subsystem block in a model. For example, an appropriate access parameter could be associated with a block's top-level parameter dialog box. A system administrator or user with the appropriate level of permission rights (that is, the right to modify permissions of the library) could then set that access parameter to a value that defines a given access level. The given access level could, for instance, allow a user to view the contents of the library subsystem block, use the library subsystem block in models (by creating links) and create a subclass instance, but prevent the user from modifying the contents of the original library subsystem block.

By extending the concept of subclassing to the graphical domain, the subclassing process 40 described above in reference to FIGS. 3–5 greatly empowers users by giving users the ability to tailor graphical classes to their own applications. The subclass instances have the same structure and connectivity as the graphical class instances from which they derive, but differ in the parameter values of their individual components.

Other embodiments are within the scope of the following claims.

What is claimed is:

1. A method of graphical block diagram modeling, comprising:

providing a plurality of graphical blocks interconnected to form a graphical subsystem, said graphical subsystem represented as a graphical subsystem block in a graphical block diagram model;

constructing a graphical class instance of a graphical class that corresponds to the graphical subsystem block for use in said graphical block diagram model;

changing a value of a parameter of a selected one of the plurality of graphical blocks interconnected to form the graphical subsystem block, said changing occurring in response to a user selection; and constructing from the graphical class instance and the changed value a graphical subclass instance that inherits structure from the graphical class, said structure reflecting the structure indicated in the graphical class at the time of the constructing.

2. The method of claim 1, further comprising:

providing to the user a user interface having a dialog box corresponding to the selected one of the plurality of graphical blocks, said user interface accepting input from the user for a parameter being changed.

3. The method of claim 1, further comprising:

storing data associated with the changed parameter in a data structure as subclass data, the subclass data in the data structure defining a subclass from which the graphical subclass instance is instantiated.

4. The method of claim 3, further comprising:

wherein the subclass data includes at least one of a relative path to the graphical subsystem block, a name of the parameter and the changed value.

5. The method of claim 1, further comprising:

merging the graphical subclass instance with the graphical class, said merging performing one of propagating the changed parameter to the graphical class and re-instantiating an instance of the graphical class in place of the graphical subclass instance.

6. The method of claim 1, further comprising:

associating a visual cue with the graphical subclass instance to allow the user to distinguish the graphical subclass instance from the graphical class instance.

7. The method of claim 6, wherein the user is provided a display of the selected graphical block that has a title, and further wherein associating comprises modifying the title to indicate to the user that a graphical subclass instance has been constructed for the selected block.

8. The method of claim 6, wherein the user is provided with a display of the graphical block diagram model that includes the graphical subsystem block, and further wherein associating comprises modifying the display to indicate to the user that a graphical subclass instance has been constructed for the selected block.

9. The method of claim 1, wherein the structure comprises connectivity and layout information.

10. A method of graphical block diagram modeling, comprising:
  providing a class library comprising graphical classes defined in terms of graphical subsystem blocks, the subsystem blocks comprising sub-blocks; and
  creating a graphical subclass of a selected one of the graphical classes by modifying a sub-block parameter that is not a top level parameter of the selected class, wherein the subclass inherits subsequent changes to the graphical class.

11. A computer program product residing on a computer-readable medium for graphical block diagram modeling, the computer program comprising instructions causing a computer to:
  provide a plurality of graphical blocks interconnected to form a graphical subsystem, said graphical subsystem represented as a graphical subsystem block in a graphical block diagram model;
  construct a graphical class instance of a graphical class that corresponds to the graphical subsystem block for use in said graphical block diagram model;
  change a value of a parameter of one of the plurality of graphical blocks interconnected to form the graphical subsystem block, said changing occurring in response to a selection by the user; and
  construct from the graphical class instance and the changed value a graphical subclass instance that inherits structure from the graphical class, said structure reflecting the structure indicated in the graphical class at the time of the constructing.

12. The medium of claim 11, wherein the instructions further cause the computer to:
  provide to the user a user interface having a dialog box corresponding to the selected one of the graphical blocks interconnected to form the graphical block subsystem, said user interface accepting input from the user for a parameter being changed.

13. The medium of claim 11, wherein the instructions further cause the computer to:
  store data associated with the changed parameter in a data structure as subclass data, the subclass data in the data structure defining a subclass from which the graphical subclass instance is instantiated.

14. The medium of claim 13, wherein the subclass data includes at least one of a relative path to the graphical subsystem block, a name of the parameter and the changed value.

15. The method of claim 11, wherein the instructions further cause the computer to:
  merge the graphical subclass instance with the graphical class, said merge performing one of propagating the changed parameter to the graphical class and re-instantiating an instance of the graphical class as the graphical subclass instance.

16. The medium of claim 11, wherein the instructions further cause the computer to:
  associate a visual cue with the graphical subclass instance to allow the user to distinguish the graphical subclass instance from the graphical class instance.

17. The medium of claim 16, wherein the user is provided a display of the selected graphical block that has a title, and the associating comprises modifying the title to indicate to the user that a graphical subclass instance has been constructed for the selected block.

18. The medium of claim 16, wherein the user is provided with a display of the graphical block diagram model that includes the graphical subsystem block, and the associating comprises modifying the display to indicate to the user that a graphical subclass instance has been constructed for the selected block.

19. A computer system comprising:
  means for providing graphical blocks interconnected to form a graphical subsystem block in a block diagram;
  means for constructing a graphical class instance of a graphical class that corresponds to the graphical subsystem block for use in said graphical block diagram model;
  means for enabling a change to a value of a parameter of a selected one of the graphical blocks interconnected to form said graphical subsystem block, said change made by a user; and
  means for constructing from the graphical class instance and the change a graphical subclass instance that inherits structure from the graphical class.

20. A computer system comprising:
  means for providing a class library comprising graphical classes defined in terms of graphical subsystem blocks, the subsystem blocks comprising sub-blocks; and
  means for creating a graphical subclass of a selected one of the graphical classes by modifying a sub-block parameter that is not a top level parameter of the selected class, wherein the subclass inherits subsequent changes to the graphical class.

* * * * *

UNITED STATES PATENT AND TRADEMARK OFFICE
CERTIFICATE OF CORRECTION

| | | |
|---|---|---|
| PATENT NO. | : 6,868,526 B2 | Page 1 of 1 |
| APPLICATION NO. | : 09/908085 | |
| DATED | : March 15, 2005 | |
| INVENTOR(S) | : Sanjai Singh | |

It is certified that error appears in the above-identified patent and that said Letters Patent is hereby corrected as shown below:

On the Title Page, at Item (73) Assignee, replace "The Mathworks, Inc." with
--The MathWorks, Inc.--.

Signed and Sealed this
Second Day of December, 2014

Michelle K. Lee
*Deputy Director of the United States Patent and Trademark Office*